Patented Nov. 26, 1946

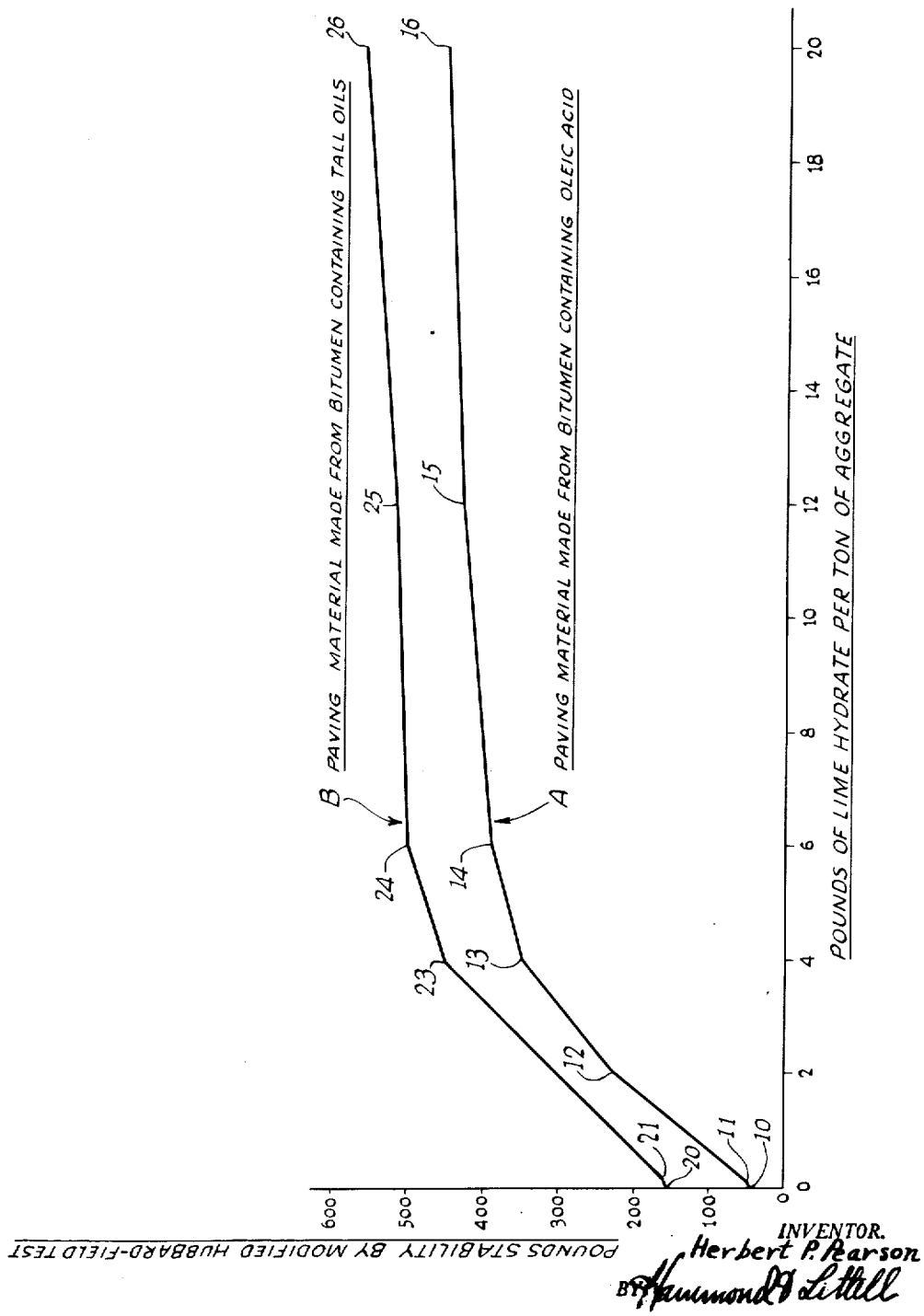

2,411,634

UNITED STATES PATENT OFFICE 2,411,634

BITUMINOUS PAVED SURFACE AND METHOD OF MAKING THE SAME

Herbert P. Pearson, New York, N. Y., assignor to Howard B. Bishop, Summit, N. J.

Application May 19, 1945, Serial No. 594,625

11 Claims. (Cl. 106—235)

This invention relates to an improved bituminous paved surface, to improved mixes used in the production of these surfaces and to the processes by which these mixes and surfaces are made.

Many problems are faced in producing paved surfaces from mineral aggregate and asphaltic or bituminous materials. One of the greatest drawbacks to the more extensive use of such paved surfaces is the danger that showers will loosen the bonds between the bituminous material and the aggregate before the mix has been compacted, thereby resulting in an insecure bond and sometimes making it necessary to dig up the surface and re-lay it. Careful control of the moisture content of the aggregate has been considered necessary to successful road laying. Additionally, poor surface contact between the bituminous material and the aggregate, absorption of the bitumen by the aggregate, and lack of uniform distribution of the bitumen over the aggregate, probably due to a lack of adequate affinity between the aggregate and bitumen, has frequently made it necessary to utilize an excess of bitumen to assure satisfactory coating and durability in the completed paved surface. As a result, the pavement, which is excessively rich in bitumen, is slippery in wet weather and excessively soft in hot weather.

In preparing a bituminous surface, an aggregate and bitumen having sufficient fluidity and in an amount adequate to thoroughly coat the aggregate are first formed into a mix and then the mix is laid and compacted. After compaction, the bitumen cures to impart the adhesion and cohesion required to cement the mix into a paved surface possessing the necessary stability and durability. Where both hot bitumen and hot aggregate are used, as in the hot mix process, the heat imparts and maintains the necessary fluidity in the bitumen and, as a result, the cure of the bitumen results wholly from cooling. In the hot mix process, any type of aggregate may be used including a large proportion of fine aggregate which imparts improved stability and durability to the resulting surface. If necessary, enough fine aggregate may be used to render the compacted mix substantially impervious to liquids. In making cold bitumen mixes, the field to which this invention especially pertains, it is necessary to impart the viscosity or fluidity to the bitumen, at the relatively low operating temperatures involved, by using solvents or diluents. These solvents or diluents must later volatilize off to cure the bitumen and impart the cohesion and adhesion required to give the desired stability and durability to the paved surface. In this cold mix process, a problem is encountered in procuring paved surfaces which are resistant to stripping action and possess adequate stability and durability. If the mix is sufficiently open to procure an early and complete cure it normally is lacking in stability and durability and the bitumen is easily stripped from the aggregate after the surface is laid, particularly if the aggregate is moist or rain is encountered during the laying. On the other hand, if sufficient fines are used to impart water imperviousness, the bitumen cures too slowly or cures only on the surface and leaves uncured bitumen below the cured surface, thereby rendering the pavement unstable.

It is an object of this invention to provide a bituminous surface, by the cold mix process, having improved stability and durability, high early strength, strong resistance to water and exceptional resistance to stripping.

It is another object of this invention to provide a process for producing a bitumen-treated mix which may be compacted into an improved bitumen-treated paved surface having a strong bond under most unfavorable weather conditions.

Another object of the invention is to provide a process which will produce a satisfactory mix that will form a stable paved surface when laid in rain or under water.

Yet another object is to provide a cold mix paving process permitting the use of aggregates substantially free of fines whereby the dust nuisance is avoided and an open mix is obtained which quickly cures into pavements of superior durability and stability affording excellent traction for vehicles.

Still another object is to provide an improved cold mix paving process wherein conventional cutback bitumen may be further diluted and used in colder weather than heretofore possible.

A further object is to provide a simple, but effective, process by means of which wet or dry, porous or non-porous, hydrophilic or hydrophobic mineral aggregate may be utilized to produce paved suraces meeting all and even exceeding usual standards of durability and stability.

An additional object is to provide paved surfaces made from mineral aggregate and bituminous material which use a smaller amount of bitumen than heretofore necessary in the production of such surfaces whereby a more stable and better paved surface is obtained.

A special object is to provide a bitumen-treated mineral aggregate which may be stored in stockpiles over extended periods of time, say a year or more, without loss of its workability, and suitability as a paving material.

Other objects, purposes and features of my invention will be apparent from the more detailed description which follows:

In the practice of my invention, I jointly mix mineral aggregate used in making my paved surface preferably with a rosin acid material, as defined hereinafter, and with lime in a considerable excess of that theoretically necessary to neutralize the acid material whereby a reaction takes place between the acid material and the lime, in the presence of the aggregate to form in situ a plastic substance of undetermined composition forming a coating around each particle of the aggregate. When this procedure is followed, in providing mixes, bituminous compositions of superior stability and durability are obtained.

The amount of lime needed will vary depending on whether quicklime or hydrated lime is used, at least one third more hydrated lime being used than quicklime, but in all instances the lime must be present in substantial excess of the stoichiometric proportions of the rosin acid material. In my copending application, Serial No. 292,108, filed August 26, 1939, of which the present application is a continuation-in-part, I disclose a cold mix process for making a bituminous paved surface from a mix containing conventional aggregate wherein .08 to 1.8 pounds of rosin acids, and in particular wood rosin acids, and from 3 to 10 pounds of quicklime are used per ton of mix. This represents a minimum of about 2.8 pounds per ton of aggregate of quicklime in excess of that necessary to react with the rosin acid material. Corresponding amounts of lime hydrate would vary from about 4 to 14 pounds or about 3.8 pounds of lime hydrate in excess of the stoichiometric proportions of the acid. Amounts of lime and rosin acid material in excess of those specified may be used, but the improvements, if any, are not warranted by the added costs involved.

The great importance of this large excess of lime over that necessary to react with oleic or tall oil acids is illustrated in the accompanying graph.

In the standard Hubbard-Field test for indicating stability of a paving mix, the test is conducted to show paving results under ideal conditions. In making the test, dry sand is used, the asphalt is mixed hot and the mix thoroughly cured, as by baking or drying before testing for stability. In the test shown in the accompanying graph, approximately the worst conditions encountered in applying any paving are simulated in order to show clearly the outstanding advantages of the pavement and process herein described.

Where, in the standard Hubbard-Field test used to show the improved stability of a paving material, dry Ottawa sand and a hot or cold asphalt is used and thoroughly cured before testing, in the tests illustrated in the accompanying graph, the mix was prepared in accordance with the teachings of this application and was subjected to soaking in water for 16 hours before being permitted to cure. The Ottawa sand used was a standard testing material of low stability of a 20-30 mesh and the rapid-curing asphalt was a commercial grade designated as RC-3. The oleic acid content was .8% and the tall oil acid content was 1.7% of the weight of the asphalt in all the samples tested while the amount of lime varied from sample to sample.

In the chart, the amount of lime hydrate used per ton of aggregate is plotted along the horizontal axis and the pounds stability of the paving material by the Hubbard-Field measurement test along the vertical axis. Curve A is the stability curve for varying amounts of lime when using bitumen containing .8% of oleic acid, and curve B is the stability curve when using bitumen containing 1.7% of tall oil acid. The various samples used for obtaining the stability evaluations plotted on the curves each contain the same amount of bitumen.

In curve A, point 10 represents the stability when no lime is used and point 11, which is almost indiscernibly different from 10, the stability when stoichiometric proportions of lime and oleic acid are used. Points 12, 13, 14, 15, 16 and 16 represent the stability when 2, 4, 6, 12, and 20 pounds, respectively, of lime are used.

In curve B, point 20 represents the stability when no lime is used and point 21, which is also substantially indiscernibly different from point 20, the stability when stoichiometric proportions of lime and tall oil acid are used. Points 23, 24, 25, and 26 represent the stability when 4, 6, 12, and 20 pounds, respectively, of lime are used.

This chart shows that the stability of the paving material increases rapidly in both curves A and B with increased lime, until the amount of lime hydrate equals at least 4 pounds per ton of aggregate, after which the increase in stability is much slower and negligible as compared to the increases up to this point. This amount of hydrated lime is the equivalent of about 3 pounds of quicklime.

Theoretically, it takes about ⅛ of a pound of hydrated lime to bind 1 pound of oleic or tall oil acid and about 1/10 of a pound of quicklime to bind the same amount of acid material. Thus, stated in another way, the curves show that the stability of the paving material rises rapidly until the amount of hydrated lime equals at least 3.9 pounds (2.9 pounds of quicklime) per ton of aggregate in excess of that theoretically necessary to bind the acid material used. Under actual field conditions, where mixing operations are not ideal, and other factors vary, it is wise to use considerably more lime than that found necessary when following laboratory procedures.

Curves A and B also show that, in general, the effect of the presence of lime in substantial excess of that necessary to bind the acid used in the bitumen is the same regardless of whether tall oil or oleic acid is used. The stability obtained, however, in using tall oil is always greater than that obtained when using oleic acid. Tall oil acids have other advantages not shown on the stability curves, and are the preferred acids.

In making plant mixes suitable for a cold mix process emphasized in my copending application referred to above, about 100 pounds of bitumen are normally used per ton of mix (Standard Specifications for Road and Bridge Construction, Highway Department, State of New Hampshire, 1938, page 105). The size of the aggregate, however, varies with the nature of the surface being laid, and the amount of lime, acid, and bitumen necessary to coat the aggregate varies with the size thereof. For a fine aggregate more bitumen, more lime and more acid are needed than for a coarse aggregate. In accordance with the disclosure of my said prior application, wherein about 100 pounds of bitumen are commonly used per ton of aggregate, the amount of acid varies from about .08 to 1.8%, and the amount of quicklime varies from about 3% to about 10% of the weight of asphalt. Corresponding percentages of hydrated lime would equal at least 4 to 13% of the asphalt.

Quicklime has certain theoretical advantages over hydrated lime, but the fact that it is an irritant to the eyes, mucous membranes, etc., and the ready availability and greater uniformity of the hydrated lime makes it preferable for field use. Barium hydrate may be used in place of the lime, but its incorporation in the mix under field conditions is difficult. In field operations where conditions of the aggregate and facilities for mixing are not always of the best and periods of mixing are advantageously made as short as possible, it is preferable to use lime in the upper ranges disclosed, say at least about 10% of quicklime or at least about 13% of hydrated lime, based upon the weight of bitumen necessary to bind the particular aggregate used.

It is not necessary to use pure rosin acids in producing my improved paved surfaces although a substantial portion of rosin acids, such as found for example in tall oil, are preferably present. Tall oil, which is a by-product obtained from wood pulp in the manufacture of paper, contains a minor percentage, not more than about 15%, of higher alcohols, sterols, and other inert materials and the remainder consists of about equal quantities of rosin and higher molecular weight fatty acids. Rosin acids or admixtures of rosin acids with fatty acids, such as found in tall oil, are referred to herein as "rosin acid material." I have found, by using rosin acid materials and lime instead of higher molecular weight fatty acids alone and lime, in the proportions disclosed, that the coating of the aggregate is speeded up, the mix has greater water-repellence, the adhesion between the aggregate and bitumen is improved and greater stability and durability is obtained in the paved surface. The amount of rosin acid material used depends to some extent upon the nature of the aggregate, but normally the amount of acid materials need not exceed about 1.8% of the weight of the bitumen. Larger percentages may be used but no advantages are achieved thereby and in some instances the larger proportions of these acidic materials may be decidedly deleterious.

While distinct advantages are obtained in using rosin acid materials, it should be understood that there is a definite advantage in using my large excess of lime with other soap-forming carboxylic acids such as the soap-forming fatty acids, of which oleic and especially linoleic acid are illustrative. Such acid materials are referred to herein collectively as a "soap-forming acid material."

The lime or the acid may be added to the mineral aggregate in any sequence or simultaneously but normally the liquid acid material and the lime cannot be mixed in advance. Alternatively the lime may be added to the aggregate and the acid to the bituminous material or to a liquefier before the bitumen is added. It will be understood, therefore, that in speaking generally of adding acid material or lime to the aggregate any sequence is contemplated which embodies adding these two ingredients in their unreacted state in order that they may be free to react in situ. Although the acid material and the lime may be added in any desired sequence, certain preferential sequence of treatments may be followed in treating the mineral aggregate or in producing the mix from which the paved surface is made.

In the application of the rosin acid materials or fatty acids or mixtures of rosin and fatty acids to the aggregate, it is advantageous to introduce them in a suitable liquid medium, although they may be added directly. The rosin acid material may be introduced in the form of an aqueous emulsion or dissolved in an organic solvent. The preferred emulsifiers are oil-soluble. Salts of oil-soluble sludge acids are effective emulsifiers and have the added advantage of being very inexpensive. When organic solvents are used as carriers for the acids, those compatible with various bituminous materials are preferred, such as kerosene, fuel oil, gasoline or other hydrocarbon solvents. When using tall oil, a mixture of about 85% of tall oil and about 15% of kerosene or Diesel oil gives a free-flowing solution of high concentration which may be easily applied and economically handled and transported. Under certain circumstances, it will be found advantageous to dilute further this solution before adding it to the aggregate. It will be understood, however, that the amount of liquefier, rosin acid material and emulsifier may vary within wide limits, say 10 to 70 parts, by weight, of liquefier, 8 to 60 parts, by weight, of rosin acid material, and 0 to 60 parts, by weight, of emulsifier.

The process and products of my invention are especially adaptable for use in the cold mix process either when cut-back asphalt is used or when asphalt and liquefier are added separately. Regardless of the process used, it is important that the lime come into intimate contact with the aggregate. Therefore, I generally prefer to add the lime in the early stage of my process, although the acid in a suitable liquid carrier may be added first. When the liquefier is added separately and the aggregate is dry, I usually prefer to add the liquefier first and the lime later. On the other hand, if the aggregate is wet, lime may be added prior to the addition of suitable liquefiers, such as kerosene, gasoline, and naphtha, and the like. In either instance, the agitation caused by the operation of the pug mill, or other mixing device, will insure intimate admixture of the aggregate and the lime. After the lime has been brought into intimate contact with the aggregate, the rosin acid material is introduced. Thereafter, the hot liquid asphalt cement, in quantities normally heretofore used for that size of aggregate or even in lesser quantities, is introduced and, upon further agitation, a mix is obtained wherein the aggregate is completely covered. When using the proportions of rosin acid materials and lime herein disclosed the mix is highly water-repellent and suitable for immediate compaction, and upon sufficient compaction sets-up into a bituminous surface having durability and stability superior to those in which the asphalt is added directly to untreated wet or dry aggregate.

When using the cut-back process, it is preferable that the mineral aggregate be wet, for under these circumstances, the liquefier for the asphaltic material is already incorporated in the bitumen. If only dry aggregate is available and it is deemed advisable to use the cut-back process, the aggregate may be moistened with water or liquefier before or after being introduced into the pug mill. The lime is then added to the moist aggregate and intimately mixed therewith. Thereafter, the rosin acid material, in an appropriate liquefier, is either added separately or in admixture with the cut-back asphalt. In the latter case, the rosin acids are thoroughly mixed with the cut-back before it is poured onto the mineral aggregate. When the rosin acid material and the lime are added separately, the order of addition may be reversed. The mixes and paved surfaces produced from cut-back asphalt have substantially the same properties as those obtained when the bitumen and liquefier are added separately.

Where the mix is to be used for stockpiling, it is important that the aggregate be wet with water prior to the introduction of the rosin acid material, the lime, and the cut-back bitumen. When wetting a dry, or partially dry aggregate, an addition of water until the color of the aggregate is darkened by the moisture is usually sufficient. The amount of water necessary to produce the desired degree of wetting depends largely upon the type of aggregate and may range from 1% of the weight of the aggregate, when 2 inch stone is used, to 14% of the weight of the aggregate, when very fine sand is used. In either instance, however, sufficient water will naturally adhere to the aggregate. By proceeding in accordance with my process and carefully controlling the water content of the aggregate, I have produced bitumen-coated mineral aggregates having a much longer workability in the stockpile than has heretofore been possible, say for periods of six months or a year, or longer. Yet when this stockpile of bitumen-coated material is used to create a paved surface, results are achieved which are superior to those procurable with many freshly prepared bituminous materials. Regardless of whether a fresh mix or the stockpile material is used for patching, my bituminous mix adheres so strongly to the sides of the hole and to the base coat that substantially no rutting or ravelling of the aggregate by wheels of vehicles is encountered.

Wholly satisfactory and permanent maintenance and repair patches may be made with my mixes under conditions of moisture and low temperature such that conventional cold-mixes would not join or adhere to the surrounding pavement and would promptly ravel out. My mixes will set up to a stable pavement when dumped into a "pot hole" without removing the water and have stood up over long periods of time when laid on low ground which was continuously moist and frequently flooded and when all other bituminous mixes had failed. Repairs made with my mixes under the most unfavorable weather and other conditions are equal or superior to those made from conventional mixes under ideal weather and temperature conditions.

I have found that the bitumen in my bituminous mixes containing the rosin acid material and the large excess of lime has such a high affinity for the aggregate and the mix such high cohesive strength that it may be successfully laid under water and used to form revetments, jetties, and the like. The mix may be applied in successive layers, under water, and will form a substantially homogeneous or monolithic structure. These structures have no discernible cleavage lines and, due to their inherent durability and stability, are strong and stable.

Normally, the entire process from the first preliminary treating steps to the last, in which the treated aggregate is finally covered with bitumen, is carried out in a more or less continuous manner with no unnecessary lapses of time. Regardless of whether the lime is added first or the acid is added first, once the first added reactant is thoroughly mixed with the aggregate, the other reactant may be added immediately thereafter. This rapid mixing permits very efficient utilization of the mixing apparatus. In certain cases, however, particularly where it is desirable to treat the aggregate in the mixing plant, I may take the aggregate which has been pretreated in accordance with my method wherein the acid material is first added and then the lime, remove it from the mixer before the bitumen is added, and store it for subsequent mixing with bitumen.

Some lapse of time between the addition of the various substances to the mixing mill generally should be permitted to insure proper mixing of the compounds and the reaction between the lime and rosin acid materials; but I have found that this can be very short, as the normal mill agitates the mixture with sufficient thoroughness and rapidity to insure good mixing; and the reaction takes place rapidly even if one material is added within 30 seconds or less after the other.

One of the great advantages of my invention resides in the fact that mineral aggregates of any composition may be used in any available form: wet, dry, or moist. The speed with which the large excess of lime and acid materials react in situ together with the large excess of lime provides a highly water-repellent asphaltic mix possessing properties of adhesion and cohesion such that the mix may be easily compacted and yet will quickly and permanently set up into a pavement exceptionally resistant to stripping. The high early strength of my pavements permits an early opening of highways to traffic, making my process especially valuable for resurfacing and repairing existing roadways.

My process generally requires less bitumen than prior processes for obtaining comparable results, and I find I can use a cut-back lower in bitumen than is customarily possible. As a result, I can adjust the viscosity of conventional cut-back bitumen merely by adding more diluent to obtain complete coverage of the aggregate and a satisfactory mix in colder weather than heretofore possible by known cold mix processes.

Pavements made by my process will have greater stability or load-bearing capacity than pavements made from the same aggregates and bitumens without the use of my process. This fact makes possible the laying of a better grade of pavement from identical or equivalent aggregates and bitumens than has heretofore been possible by cold mix processes.

It will be understood that bitumen and asphalt are used in their generic sense and encompass various bituminous or asphaltic materials such as are used for pavings or roofings whether derived from natural asphalt deposits, from the refining of oils, or from synthetic sources.

*Example I*

A dry hydrophobic or hydrophilic aggregate suitable for use in the normal plant mix type of process is introduced into a mixing mill. A liquifier containing a mixture of the rosin acid materials, having rosin acids in the percentages disclosed, is introduced in the proportion of 1 to 3 pounds of rosin acid material per ton of mix and thoroughly mixed therewith. Pulverized quicklime is then added to the mixture in the amount of 3 to 10 pounds, per ton of the mix. After thorough agitation of the material to permit reaction between the rosin acid material and the lime and the precipitation of the reaction product on the surface of the aggregate, the usual quantity of bitumen, say about 100 pounds and the usual quantity of filler, if desired, are added and the whole mix is agitated until the aggregate has been thoroughly coated. The coating so produced adheres firmly to the mineral aggregate and is highly water-repellent.

By following the procedure of this example, I may, under many circumstances, use from 10 to 30% less bitumen to obtain greater pavement stability than that obtained in accordance with prior art practices.

*Example II*

Pulverized quicklime, in the proportion of 3 to 10 pounds per ton, is added to a wet hydrophobic aggregate which has previously been charged into a mixing mill. After thorough agitation, asphalt cut-back previously treated with 1 to 3%, by weight, of my aqueous emulsion of rosin acids, emulsified with an alkali salt of an oil-soluble sludge acid, is added. After the usual amount of filler has been added and the entire mixture thoroughly stirred, the resulting product shows no tenderness to friction and is highly water-resistant.

*Example III*

A dry aggregate, suitable for a cold mix process, is introduced into a mixing mill. Thereafter, a solution of wood rosin acids, such as tall oil, dissolved in a coal tar or other hydrocarbon solvent, is added in a quantity sufficient to wet the surface of the aggregate. After thorough agitation, pulverized quicklime, in the proportion of 3 to 10 pounds, per ton of the mixture, is added, and these materials further agitated. Then the usual quantity of hot bitumen, dependent upon the size of the aggregate, say about 90 pounds per ton of aggregate, is added, and upon further agitation, a coating is produced which is firmly bound to the mineral aggregate.

*Example IV*

An aggregate is prepared having the following screen analysis:

| | Per cent |
|---|---|
| Total passing ¾ | 65–90 |
| Total passing ½ | 50–80 |
| Total passing No. 4 | 35–65 |
| Total passing No. 10 | 20–45 |
| Total passing No. 40 | 10–20 |
| Total passing No. 80 | 5–10 |
| Total passing No. 200 | 0–5 |

This aggregate is introduced into a pug mill, and water is introduced in sufficient quantities to render the aggregate dark in color. When using a ton of aggregate in the pug mill, about 12 pounds of lime hydrate is introduced, under agitation, to form a thorough admixture of aggregate and lime. Thereafter, about 100 pounds of MC cut-back asphalt, containing about 1.7% of tall oil, is introduced and the agitation continued until the aggregate is thoroughly coated with the asphalt. This bitumen-covered aggregate can be stored in the stockpile for periods in excess of nine months without losing its suitability for patching bituminous roadways. Upon being laid, the material is easily compacted, and the roadway may be used for traffic soon after laying. The material adheres so strongly to the roadway that it is not picked up by the wheels of vehicles passing thereover.

*Example V*

Another aggregate, substantially free of fines, is prepared having the following screen analysis:

| | Per cent |
|---|---|
| Total passing ¾" screen | 100 |
| Total passing ½" screen | 80 |
| Total passing No. 4 screen | 50 |
| Total passing No. 10 screen | 15 |
| Total passing No. 80 screen | 5 |
| Total passing No. 200 screen | 0 |

This aggregate is preferably agitated in a suitable mixing mill with sufficient water to make it dark in color. Thereafter, lime hydrate in a quantity equaling at least 12 pounds per ton of aggregate is added to the mill and agitation continued until the aggregate and lime are thoroughly mixed. Where facilities for mixing the aggregate and lime are poor, a greater quantity of lime hydrate may be required, say up to 20 pounds per ton of aggregate. After the lime hydrate is thoroughly mixed with the aggregate, 100 pounds of commercial medium-cure bitumen, known as MC-2, containing 2 pounds of a tall oil solution, consisting of about 1.7 pounds of tall oil and the remainder a kerosene solvent, are added per ton of aggregate. Upon continuing the agitation for several minutes, the aggregate is thoroughly coated with the bitumen.

This mix when laid and compacted extrudes excess water and quickly sets up into a bitumen of superior stability and durability. Due to the absence of fines, the surface is somewhat rough and affords excellent traction for tires of automobiles and other vehicles. The pavement has the additional advantage of being sufficiently open to permit "breathing" of the pavement, and yet the pavement is so resistant to the stripping action of water that the stability of such pavement exceeds those made by conventional cold mix processes using a considerable percentage of fines to impart stability.

In cold weather the MC-2 may be further diluted to render it less viscous and obtain a thorough coating of the cold aggregate under conditions heretofore considered impossible. Even with this diluted bitumen, paved surfaces are obtained which are as stable and durable as those obtained with undiluted cut-back.

*Example VI*

Where moist or wet hydrophilic or hydrophobic aggregate is used, the pulverized quicklime, in the amount of three to ten pounds per ton, is added first to the usual quantity of aggregate in the mill. These materials are agitated and subjected to the action of one to three pounds per ton of mix of a liquefier containing both my rosin mixture and an emulsifying agent, such as an alkali salt of an oil-soluble sludge acid. After the mixture has been agitated, the usual quantity of hot bitumen and the usual amount of filler are added. In spite of the fact that wet aggregate is used, the resulting product will not give evidence of stripping tendencies and is highly water resistant.

*Example VII*

Barium hydrate, in the amount of one pound per cubic yard of aggregate, is dissolved in twenty-five times its weight of water. This solution is then added to the wet or dry aggregate on the roadway. After mixing these materials by the usual blading process, they are subjected to the action of one to three pounds per cubic yard of a mixture of rosin acids and an oil-soluble emulsifying agent previously dissolved in the usual quantity of cut-back, which solution is then completely mixed on the roadway with the previous materials. In spite of the large quantity of water added with the barium hydrate, the resulting product will not give evidence of stripping tendencies and is highly water resistant.

Example VIII

For the purpose of road building by the penetration method, add from one and one half to three pounds per cubic yard of aggregate of a mixture containing both a mixture of rosin acids and an emulsifying agent to the molten asphalt cement commonly used in the penetration method of road building. After thorough stirring, from four to eight pounds of finely pulverized quicklime is added gradually and stirred in. The thus treated asphalt is then sprayed on the wet or dry aggregate already laid on the roadway.

By this method, the period of waiting for wet aggregate to dry is avoided, and the asphalt adheres firmly to the aggregate and is highly water resistant.

Example IX

In any of the foregoing examples, the rosin acid material may be replaced with an equal quantity of a soap-forming fatty acid such as oleic, and more particularly linoleic acid, and the large excess of lime used will show the advantages heretofore discussed. These fatty acids, however, are most advantageously used with hydrophilic aggregates. In general and especially with hydrophilic aggregates, the set up is slower, the water resistance lower, and the durability and stability of the paved surfaces are inferior when the fatty acids are used to replace the rosin acid material.

Those familiar with paving procedure will experience no difficulty in following my process and in providing bituminous mixes and bituminous paved surfaces of superior properties using other types of aggregates. The proportions of lime and rosin acid material, as compared to the amount of bitumen, will be those disclosed herein, and the amount of bitumen may be that heretofore used although such mixes may be unnecessarily rich under certain circumstances, and results equal to or superior to those heretofore achieved may be obtained by using from 10 to 30% less bitumen for the same size of the aggregate than that necessary when not using my rosin acid material and lime in the proportions taught.

I have set forth certain theories in explaining the operation of my invention which I believe to be correct, but I do not wish to be bound by these theories.

It will be understood that the embodiments of my invention described and illustrated herein are only representative of the principles of my invention and the agents used therein. Various modifications in the illustrative embodiments of my invention can be made without departing from the spirit of the invention or its scope which is defined in the appended claims.

I claim:

1. A cold mix process for making a bituminous paving material comprising wetting an aggregate substantially free of fines with sufficient water to render it dark in color, agitating the wetted aggregate with lime and agitating the lime-treated aggregate with cut-back bitumen and with a rosin acid material, said lime being present in an amount equaling at least 2.8 pounds per ton of aggregate in excess of the amount theoretically necessary to react with said acid material.

2. A cold mix process for making a bituminous mix which will set up under water, comprising thoroughly mixing a mineral aggregate first with one and thereafter with another of two reactants, one of said reactants being a rosin acid material and the other reactant being lime in an amount equaling at least 2.8 pounds per ton of aggregate in excess of the amount theoretically necessary to react with said acid material and with liquid cut-back bitumen.

3. A cold mix process for making a bituminous paving material suitable for compacting into a pavment having exceptional durability, stability and resistance to the stripping action of water comprising thoroughly mixing a moist mineral aggregate with hydrated lime and thereafter thoroughly mixing the lime-coated aggregate with liquid cut-back bitumen containing a rosin acid material, the amount of hydrated lime being at least 4 pounds per ton of aggregate and at least 3.8 pounds per ton of aggregate in excess of the amount necessary to react with the rosin acid material in the bitumen.

4. The cold-mix method of making a bituminous water resistant paving material which comprises treating a mineral aggregate with an emulsion of rosin acids having as its emulsifyling agent an alkali salt of an oil-soluble sludge acid, and agitating the mixture to thoroughly coat the aggregate with the emulsion of rosin acids, and immediately thereafter treating the emulsion-coated aggregate with an alkaline material selected from the group consisting of hydrated lime and quicklime and immediately thereafter adding and mixing liquid cut-back bitumen with said aggregate, said alkaline material being present in an amount equaling at least 2.8 pounds per ton of aggregate in excess of the amount theoretically necessary to react with said rosin acids.

5. The cold-mix method of making a butumious water-resistant paving material which comprises treating a mineral aggregate with rosin acids in an oil solvent and agitating the mixture to thoroughly coat the aggregate with the rosin acids, and immediately thereafter treating the coated aggregate with an alkaline material selected from the group consisting of hydrated lime and quicklime and immediately thereafter adding and mixing liquid cut-back bitumen with said aggregate, said alkaline material being present in an amount equaling at least 2.8 pounds per ton of aggregate in excess of the amount theoretically necessary to react with said rosin acids.

6. The cold-mix method of making a bituminous water-resistant paving material which comprises treating a mineral aggregate with a mixture of rosin acids and an alkali metal salt of an oil-soluble sludge acid as an emulsifying agent in an oil solvent, agitating the mixture to thoroughly coat the aggregate with the emulsion of rosin acids, and immediately thereafter treating the emulsion-coated aggregate with an alkaline material selected from the group consisting of hydrated lime and quicklime and immediately thereafter adding and mixing liquid cut-back bitumen with said aggregate, said alkaline material being present in an amount equaling at least 2.8 pounds per ton of aggregate in excess of the amount theoretically necessary to react with said rosin acids.

7. The cold-mix method of making a bituminous water-resistant paving material which comprises treating a mineral aggregate with an emulsion of rosin acids having as its emulsifying agent an alkali salt of an oil-soluble sludge acid in the presence of an alkaline material selected from the group consisting of hydrated lime and quicklime and immediately thereafter adding and mixing liquid cut-back bitumen with said aggregate, in which the entire series of steps is completed in a continuous manner with no unnecessary lapse of time, said alkaline material being present in an amount equaling at least 2.8 pounds per ton of aggregate in excess of the amount theoretically necessary to react with said rosin acids.

8. The cold-mix method of making a bituminous water-resistant paving material which comprises treating a mineral aggregate with rosin acids in an oil solvent, and agitating the mixture to thoroughly coat the aggregate with the rosin acids, and immediately thereafter treating the coated aggregate with an alkaline material selected from the group consisting of hydrated lime and quicklime and thereafter adding and mixing liquid cut-back bitumen with said aggregate, said alkaline material being present in an amount equaling at least 2.8 pounds per ton of aggregate in excess of the amount theoretically necessary to react with said rosin acids.

9. The cold-mix method of making bituminous water-resistant paving material which comprises treating a mineral aggregate and agitating it with first one and immediately thereafter with the other of two reactants, one of said reactants being lime hydrate and the other being a rosin acid in a liquid medium, and immediately thereafter adding and mixing liquid cut-back bitumen with said aggregate, said lime hydrate being present in an amount equaling at least 3.8 pounds per ton of aggregate in excess of the amount necessary to react with said rosin acid.

10. The cold-mix method of making a bituminous water-resistant paving material which comprises treating a mineral aggregate with lime hydrate and agitating the mixture to thoroughly coat the aggregate with the lime hydrate and immediately thereafter treating the coated aggregate with a rosin acid in a liquid medium and immediately thereafter adding and mixing liquid cut-back bitumen with said aggregate, said lime hydrate being present in an amount equaling at least 3.8 pounds per ton of aggregate in excess of the amount necessary to react with said rosin acid.

11. The cold-mix method of making a bituminous water-resistant paving material which comprises treating a mineral aggregate with lime hydrate, agitating the mixture to thoroughly coat the aggregate with the lime hydrate, and immediately thereafter adding and mixing a liquid cut-back bitumen containing a rosin acid with said aggregate, said lime hydrate being present in an amount equaling at least 3.8 pounds per ton of aggregate in excess of the amount necessary to react with said rosin acid.

HERBERT P. PEARSON.

Certificate of Correction

Patent No. 2,411,634. November 26, 1946.

HERBERT P. PEARSON

It is hereby certified that errors appear in the printed specification of the above numbered patent requiring correction as follows: Column 3, line 63, for "paying" read *paving*; column 11, lines 35 and 36, Example IX, for "hydrophilic" read *hydrophobic*; and that the said Letters Patent should be read with these corrections therein that the same may conform to the record of the case in the Patent Office.

Signed and sealed this 18th day of February, A. D. 1947.

[SEAL]

LESLIE FRAZER,
*First Assistant Commissioner of Patents.* amount theoretically necessary to react with said rosin acids.

7. The cold-mix method of making a bituminous water-resistant paving material which comprises treating a mineral aggregate with an emulsion of rosin acids having as its emulsifying agent an alkali salt of an oil-soluble sludge acid in the presence of an alkaline material selected from the group consisting of hydrated lime and quicklime and immediately thereafter adding and mixing liquid cut-back bitumen with said aggregate, in which the entire series of steps is completed in a continuous manner with no unnecessary lapse of time, said alkaline material being present in an amount equaling at least 2.8 pounds per ton of aggregate in excess of the amount theoretically necessary to react with said rosin acids.

8. The cold-mix method of making a bituminous water-resistant paving material which comprises treating a mineral aggregate with rosin acids in an oil solvent, and agitating the mixture to thoroughly coat the aggregate with the rosin acids, and immediately thereafter treating the coated aggregate with an alkaline material selected from the group consisting of hydrated lime and quicklime and thereafter adding and mixing liquid cut-back bitumen with said aggregate, said alkaline material being present in an amount equaling at least 2.8 pounds per ton of aggregate in excess of the amount theoretically necessary to react with said rosin acids.

9. The cold-mix method of making bituminous water-resistant paving material which comprises treating a mineral aggregate and agitating it with first one and immediately thereafter with the other of two reactants, one of said reactants being lime hydrate and the other being a rosin acid in a liquid medium, and immediately thereafter adding and mixing liquid cut-back bitumen with said aggregate, said lime hydrate being present in an amount equaling at least 3.8 pounds per ton of aggregate in excess of the amount necessary to react with said rosin acid.

10. The cold-mix method of making a bituminous water-resistant paving material which comprises treating a mineral aggregate with lime hydrate and agitating the mixture to thoroughly coat the aggregate with the lime hydrate and immediately thereafter treating the coated aggregate with a rosin acid in a liquid medium and immediately thereafter adding and mixing liquid cut-back bitumen with said aggregate, said lime hydrate being present in an amount equaling at least 3.8 pounds per ton of aggregate in excess of the amount necessary to react with said rosin acid.

11. The cold-mix method of making a bituminous water-resistant paving material which comprises treating a mineral aggregate with lime hydrate, agitating the mixture to thoroughly coat the aggregate with the lime hydrate, and immediately thereafter adding and mixing a liquid cut-back bitumen containing a rosin acid with said aggregate, said lime hydrate being present in an amount equaling at least 3.8 pounds per ton of aggregate in excess of the amount necessary to react with said rosin acid.

HERBERT P. PEARSON.

Certificate of Correction

Patent No. 2,411,634.   November 26, 1946.

HERBERT P. PEARSON

It is hereby certified that errors appear in the printed specification of the above numbered patent requiring correction as follows: Column 3, line 63, for "paying" read *paving*; column 11, lines 35 and 36, Example IX, for "hydrophilic" read *hydrophobic*; and that the said Letters Patent should be read with these corrections therein that the same may conform to the record of the case in the Patent Office.

Signed and sealed this 18th day of February, A. D. 1947.

[SEAL]

LESLIE FRAZER,
*First Assistant Commissioner of Patents.*